United States Patent
Rao et al.

(10) Patent No.: US 9,771,872 B2
(45) Date of Patent: Sep. 26, 2017

(54) MODEL-BASED COMBINED CYCLE POWER PLANT LOAD CONTROL

(71) Applicant: EMERSON PROCESS MANAGEMENT POWER & WATER SOLUTIONS, INC., Pittsburgh, PA (US)

(72) Inventors: Ranjit R. Rao, Gibsonia, PA (US); Xu Cheng, Pittsburgh, PA (US); Frederick C. Huff, Pittsburgh, PA (US); Benjamin F. Gerideau, III, Monroeville, PA (US)

(73) Assignee: EMERSON PROCESS MANAGEMENT POWER & WATER SOLUTIONS, INC., Pittsburgh, PA (US)

( * ) Notice: Subject to any disclaimer, the term of this patent is extended or adjusted under 35 U.S.C. 154(b) by 116 days.

(21) Appl. No.: 14/708,782

(22) Filed: May 11, 2015

(65) Prior Publication Data
US 2016/0169154 A1    Jun. 16, 2016

Related U.S. Application Data

(60) Provisional application No. 62/092,049, filed on Dec. 15, 2014.

(51) Int. Cl.
| | |
|---|---|
| *F02C 9/16* | (2006.01) |
| *F01K 13/02* | (2006.01) |
| *F01K 23/10* | (2006.01) |

(52) U.S. Cl.
CPC .............. *F02C 9/16* (2013.01); *F01K 13/02* (2013.01); *F01K 23/101* (2013.01); *F05D 2270/44* (2013.01); *Y02E 20/16* (2013.01)

(58) Field of Classification Search
None
See application file for complete search history.

(56) References Cited

U.S. PATENT DOCUMENTS

| | | | |
|---|---|---|---|
| 2012/0239315 A1* | 9/2012 | Baker | G01M 3/2876 702/51 |
| 2016/0230699 A1* | 8/2016 | Bartlett | G05B 13/04 |

FOREIGN PATENT DOCUMENTS

| | | |
|---|---|---|
| JP | 59-115406 A | 7/1984 |

OTHER PUBLICATIONS

Search Report for Application No. GB1521859.7, dated Jun. 24, 2016.

* cited by examiner

*Primary Examiner* — Angela Ortiz
*Assistant Examiner* — Garrett Evans
(74) *Attorney, Agent, or Firm* — Marshall, Gerstein & Borun LLP

(57) ABSTRACT

A control system uses a modeled steam turbine megawatt (power) change attributed to a gas turbine demand change (i.e., a steam turbine to gas turbine transfer function) within a conventional closed loop feedback control scheme to perform control of a combined cycle power plant. This control system implements a form of internal model control and provides better unit megawatt (power) set-point tracking and disturbance variable rejection for overall more robust control, and thus operates to optimize the gas turbine operation of the combined cycle power plant in a manner that provides cost savings over time.

61 Claims, 5 Drawing Sheets

MODEL-BASED COMBINED CYCLE POWER PLANT LOAD CONTROL

RELATED APPLICATIONS

This is a regular filed application that claims priority to and the benefit of the filing date of U.S. Provisional Patent Application Ser. No. 62/092,049, entitled "Model-Based Combined Cycle Power Plant Load Control" which was filed on Dec. 15, 2014, the entire disclosure of which is hereby expressly incorporated by reference herein.

TECHNICAL FIELD

This patent relates generally to the control of power generating equipment and, in particular, to the implementation of model-based control to be used in reducing response time of a plant having multiple types of power generating equipment, such as a combined cycle power plant.

BACKGROUND

A variety of industrial as well as non-industrial applications use fuel burning boilers which typically operate to convert chemical energy into thermal energy by burning one of various types of fuels, such as coal, gas, oil, waste material, etc. An exemplary use of fuel burning boilers may be in thermal power generators, wherein fuel burning furnaces generate steam from water traveling through a number of pipes and tubes within a boiler, and the generated steam may be then used to operate one or more steam turbines to generate electricity. The electrical or power output of a thermal power generator may be a function of the amount of heat generated in a boiler, wherein the amount of heat may be directly determined by the amount of fuel consumed (e.g., burned) per hour, for example.

A typical steam generating system used in a power plant may include a boiler (known as a Heat Recovery Steam Generator (HRSG) in a combined cycle plant) having a superheater section (having one or more sub-sections) in which steam may be produced and may be then provided to and used within a first, typically high pressure, steam turbine. To increase the efficiency of the system, the steam exiting this first steam turbine may then be reheated in a reheater section of the boiler, which may include one or more subsections, and the reheated steam may be then provided to a second, typically lower pressure steam turbine. However, both the furnace/boiler section of the power system as well as the turbine section of the power system must be controlled in a coordinated manner to produce a desired amount of power.

Moreover, the steam turbines of a power plant are typically run at different operating levels at different times to produce different amounts of electricity or power based on variable energy or load demands provided to the power plant. For example, in many cases, a power plant may be tied into an electrical power distribution network, sometimes called a power grid, and provides a designated amount of power to the power grid. In this case, a power grid manager or control authority typically manages the power grid to keep the voltage levels on the power grid at constant or near-constant levels (that may be within rated levels) and to provide a consistent supply of power based on the current demand for electricity (power) placed on the power grid by power consumers. Of course, the grid manager typically plans for heavier use and thus greater power requirements during certain times of the days than others, and during certain days of the week and year than others, and may run one or more optimization routines to determine the optimal amount and type of power that needs to be generated at any particular time by the various power plants connected to the grid to meet the current or expected overall power demands on the power grid.

As part of this process, the grid manager typically sends power or load demand requirements (also called load demand set points) to each of the power plants supplying power to the power grid, wherein the power demand requirements or load demand set points specify the amount of power that each particular power plant may be tasked to provide onto the power grid at any particular time. Of course, to effect proper control of the power grid, the grid manager may send new load demand set points for the different power plants connected to the power grid at any time, to account for expected and/or unexpected changes in power being supplied to or consumed from the power grid. For example, the grid manager may change the load demand set point for a particular power plant in response to expected or unexpected changes in the demand (which may be typically higher during normal business hours and on weekdays, than at night and on weekends). Likewise, the grid manager may change the load demand set point for a particular power plant in response to an unexpected or expected reduction in the supply of power on the grid, such as that caused by one or more power units at a particular power plant failing unexpectedly or being brought off-line for normal or scheduled maintenance.

While the grid manager may provide or change the load demand set points for particular power plants at any time, steam turbine based power plants themselves cannot generally increase or decrease the amount of power being supplied to the power grid instantaneously, because steam turbine power generation equipment typically exhibits a significant lag in response time (e.g., two to four minutes) due to the physical characteristics of these systems. As is known, response time in this context is the amount of time it takes for the steam generator to reach approximately 66.6 percent of a step change in the demand. For example, to increase the power output of a steam turbine based power generation system, it may be necessary to change the amount of fuel being spent within the system, to thereby increase the steam pressure or temperature of the water within the boiler of the system, all of which takes a finite and non-trivial amount of time. Thus, generally speaking, steam turbine based power plants can only ramp up or ramp down the amount of power being supplied to the grid at a particular and relatively slow rate, which may be based on the specifics of the power generating equipment within the plant.

In an attempt to overcome or reduce this problem, some power plants, generally known as combined cycle power plants, implement both steam turbine power generation equipment and gas turbine power generation equipment. In particular, it is much easier and quicker to alter the power generating capability of gas turbine power generating equipment as the heat flow through the gas turbine is directly related to the quantity of gas burned immediately upstream of the gas turbine. In fact, the response time of most gas turbine power generating equipment is on the order of five to 30 seconds. In any event, in a combined cycle power plant, the gas turbine equipment is operated to ramp up (or down) the load output by the plant in faster manner. Moreover, in a typical combined cycle power plant, the steam turbine is run using steam created by the exhaust of the gas turbines and is primarily producing power from the waste heat of the gas turbine power generating equipment.

However, conventional combined cycle utility plants (i.e., power generating plants) run the steam turbine (ST) equipment with "valves wide open" to minimize throttling losses through the steam turbine control valves. These plants are therefore unable to modulate the steam turbine equipment to provide megawatt (MW) or power regulation. As a result, load control on most combined cycle power plants tend to be open loop systems, in which a change in the unit MW demand is sent directly to the gas turbine controllers without accounting for the potential megawatt change attributed to the steam turbines. The eventual megawatt (power) change on the steam turbine (after the lag time associated with ramping up or down the steam turbine equipment) is then subtracted from the gas turbine demand or control point to achieve the final steady state unit MW power required.

On cycling or ramping power generating units, this method of operation may mean periods of unnecessary gas turbine over or under demand because of the long heat transfer time constants across the heat recovery steam generators (HRSG) within the gas turbine exhaust, and the fact that the steam turbines are in a valves wide open mode and cannot provide load regulation.

SUMMARY

A control scheme uses a modeled steam turbine MW (power) change attributed to a gas turbine demand change, i.e., a steam turbine to gas turbine (ST/GT) transfer function, within a conventional closed loop feedback control scheme to perform control of a combined cycle power plant in a more efficient manner. This control system, which is at a basic level a form of internal model control (IMC), is believed to provide better unit MW set-point tracking and disturbance variable rejection for overall more robust control of the combined cycle power plant. Moreover, this control scheme optimizes the gas turbine operation and provides cost savings over time. This control scheme may also be applied to other types of multi-equipment type power units including, for example, combined cycle units with duct burners, or any power generation system having multiple types of power generation equipment with significantly different response times. Additionally, this control scheme may be applied in control systems that control processes or plant hardware other than power generation hardware, for example, when the outputs of multiple pieces of process or plant equipment being controlled are effected by a control signal sent to one of the pieces of equipment.

In one case, a power generation system includes multiple interconnected or interrelated pieces of power generation equipment including a gas turbine power generation unit and a steam turbine power generation unit. The gas turbine power generation unit may have a gas inlet, a gas burner coupled to the gas inlet to create combusted gas, a gas turbine coupled to the gas burner and powered by combustion of gas in the gas burner, and a combusted gas exhaust. Moreover, the steam turbine power generation unit may have a steam inlet system, a steam turbine coupled to the steam inlet system and powered by steam from the steam inlet system, and a steam outlet. In this case, the gas turbine power generation unit and the steam turbine power generation unit are interconnected such that the steam inlet system is coupled to the combusted gas exhaust to absorb heat from combusted gas in the combusted gas exhaust to produce heated steam within the steam inlet system. The power generation system also includes an electrical energy generation unit mechanically coupled to the gas turbine and to the steam turbine to produce electrical energy based on movement of the gas turbine and the steam turbine.

In addition, the power generation system includes a control system that develops a gas turbine control signal to control the combustion of gas within the gas burner to thereby control the electrical energy produced by the electrical energy generation unit. The control system may include a controller, a process model, and a controller input signal generation unit, wherein an input of the process model is coupled to an output of the controller to produce a predicted steam turbine output. Moreover, the controller input signal generation unit may develop a controller input signal for the controller by combining the predicted steam turbine output, a load set point, a measured gas turbine output and a measured steam turbine output.

If desired, the controller input signal generation unit combines the measured gas turbine output with the measured steam turbine output to produce a current unit output, and further develops a difference signal as the difference between the current unit output and the load set point. The controller input signal generation unit may further produce a predicted unit output by combining the predicted steam turbine output produced by the process model with the measured gas turbine output and may produce the controller input signal by summing the difference signal with the predicted unit output.

The control system of the power generation system may include a model adaptation unit that adapts the process model, and the model adaptation unit may be coupled to the load set point and operate to adapt the process model based on the value of the load set point. The control system may also include a gain scheduling unit, such as an adaptive gain scheduling unit, coupled to the controller to adapt one or more gain values used in the controller to produce the output of the controller. The gain scheduling unit may also be coupled to the load set point and operate to adapt the one or more gains used by the controller based on the value of the load set point. Still further, the control system may include an error integrator, such as a switchable error integrator, coupled to the output of the controller and may include a summing unit that sums the output of the error integrator with the output of the controller to produce the gas turbine control signal. Still further, the controller input signal generation unit may generate a unit error as a difference between the load set point and the sum of the measured gas turbine output and the measured steam turbine output, and the error integrator may be coupled to receive the unit error.

If desired, the process model may model the output of the steam turbine based on the operation of the gas turbine power generation unit in response to the gas turbine control signal. Moreover, in some cases, the steam turbine power generation unit may further include a further burner system that burns a fuel to further heat steam within the steam inlet system. In this case, the control system may further include a second process controller coupled to the controller input signal generation unit to produce a second process control signal used to control the further burner system and a second process model coupled to receive an output of the second process controller to produce a further predicted steam turbine output based on the operation of the further burner system. The controller input signal generation unit or process model system may then operate to combine an output of the process model with the further predicted steam turbine output to produce the predicted steam turbine output, may combine the measured gas turbine output with the measured steam turbine output to produce a current unit output, may develop a difference signal as the difference between the current unit output and the load set point, and may produce a predicted unit output by combining the predicted steam turbine output with the measured gas turbine output. Likewise, the controller input signal generation unit may further produce a preliminary controller input signal by summing the difference signal with the predicted unit output and may include a set point distributor coupled to receive the preliminary controller input signal that produces the controller input signal and a second controller input signal, which is provided as an input to the second process controller.

If desired, the electrical energy generation unit may include a first electrical generator mechanically coupled to the gas turbine to produce electrical energy based on movement of the gas turbine and a second electrical generator coupled to the steam turbine to produce electrical energy based on movement of the steam turbine.

In another example, the control system that develops a gas turbine control signal to control the combustion of gas in the gas burner to thereby control the electrical energy produced by the electrical energy generation unit, may include a controller, a process model system, and a controller input signal generation unit, wherein the process model system includes a steam turbine model coupled to an output of the controller to produce a predicted steam turbine output and a summer that sums a measured gas turbine output with the predicted steam turbine output to produce a predicted unit output. The controller input signal generation unit may develop a controller input signal for the controller by combining the predicted unit output with a load set point, the measured gas turbine output and a measured steam turbine output.

In another example, a controller for use in producing a control signal to control the operation of a power generator having first and second power generation units interconnected such that changing the control of the first power generation unit effects the operation of the second power generation unit includes a processor, and a computer readable memory that stores a controller routine for implementation on the processor to generate the control signal for use in controlling the first power generation unit. The controller routine includes a process control routine that produces an output signal used to generate the control signal, a process model system including a process model for modeling the second power generation unit, and a process control input signal generation routine. In this case, the process model is coupled to receive an output of the process control routine to produce a predicted second power generation unit output and the process model system sums a measured first power generation unit output with the predicted second power generation unit output to produce a predicted unit output. Still further, the process control input signal generation routine develops a controller input signal for the process control routine by combining the predicted unit output with a load set point, the measured first power generation unit output and a measured second power generation unit output.

Moreover, a method of controlling a process having two controllable units that are interconnected such that changing a control signal to the first unit to change an output of the first unit also changes an output of the second unit, wherein the first unit has a response time to the control signal to the first unit that is significantly shorter than the response time of the second unit to the control signal to the first unit includes measuring an output of the first unit, measuring an output of the second unit, receiving a set point indicating a desired total output of the first and second units and predicting the combined output of the first unit and the second unit in response to the control signal provided to the first unit. This prediction step may include modeling, via a processor, an operation of the second unit in response to the control signal to the first unit to develop a predicted second unit output, and adding, using the processor, the predicted second unit output with the measured output of the first unit to produce a predicted combined output of the first unit and the second unit. The method also includes developing, via a processor, a control routine input signal based on the measured output of the first unit, the measured output of the second unit, the set point and the predicted combined output of the first unit and the second unit, and executing, via the processor, a control routine that determines the control signal for use in controlling the operation of the first unit based on the control routine input signal.

If desired, modeling an operation of the second unit in response to the control signal delivered to the first unit to develop a predicted second unit output may include implementing a process model via the processor that models the response of the second unit to the control signal provided to the first unit over time. Likewise, developing the control routine input signal may include combining, using the processor, the predicted combined output of the first unit and the second unit with the set point, the measured first unit output and the measured second unit output, may include combining, using the processor, the measured first unit output with the measured second unit output to produce a combined unit output, and may include developing a difference signal as the difference between the combined unit output and the set point. Still further, developing the control routine input signal may include summing, using the processor, the predicted combined output of the first unit and the second unit with the difference signal.

The method may further include implementing, using a processor, a second process control routine to develop a second control signal for controlling an operation of the second unit via a variable control device that effects the operation of the second unit. In this case, predicting the combined output of the first unit and the second unit in response to the control signal to the first unit may include modeling, via the processor, an operation of the second unit in response to the second control signal to develop a further predicted second unit output, and adding, using the processor, the predicted second unit output and the further predicted second unit output to the measured output of the first unit to produce the predicted combined output of the first unit and the second unit. The method may also include providing the control signal to the first unit to control the operation of the first unit.

DETAILED DESCRIPTION

Figure 1:
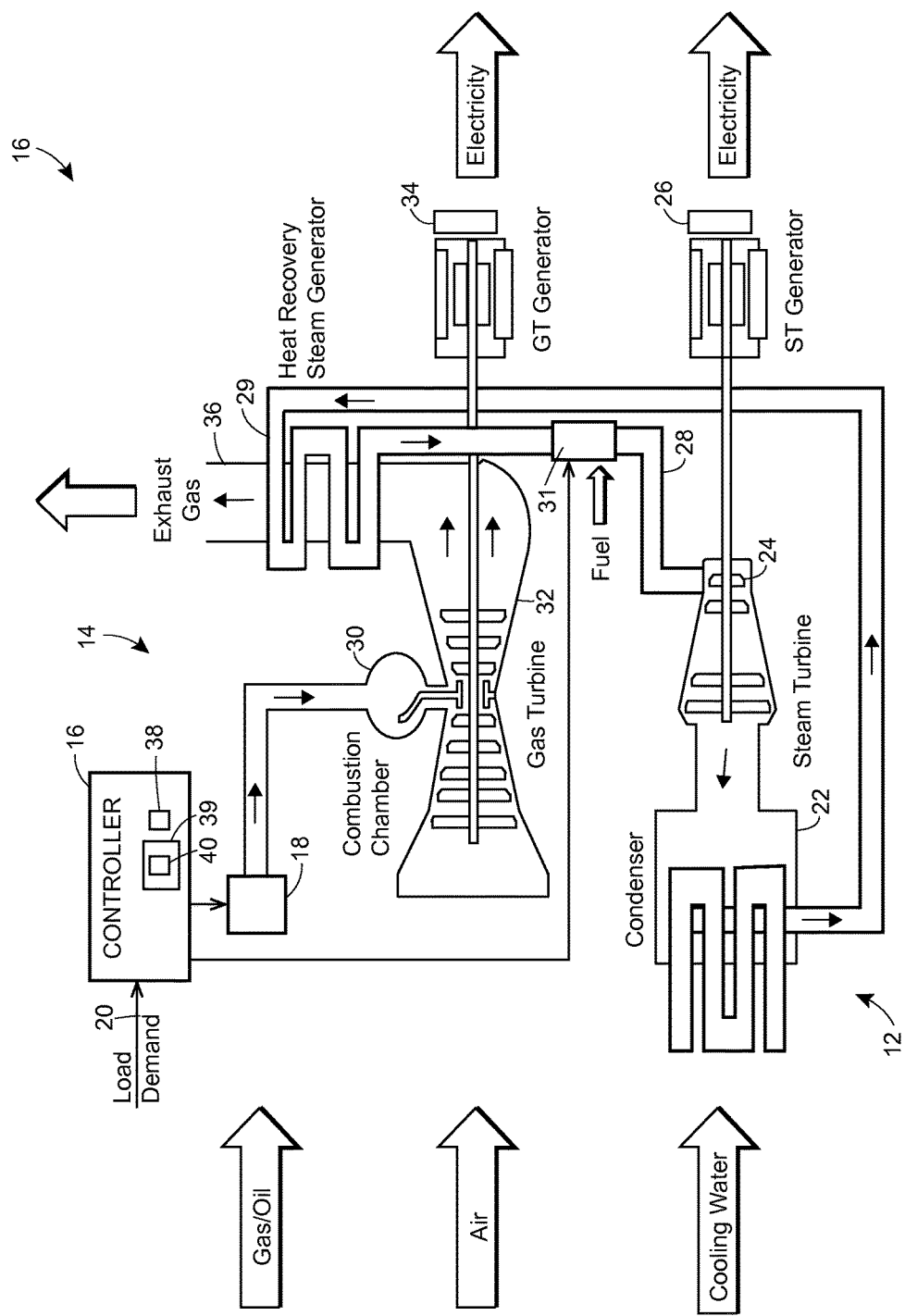
FIG. 1 illustrates a block diagram of a combined cycle power plant including steam turbine power generation equipment coupled to use heat created within a set of gas turbine power generation equipment.

Referring now to FIG. 1, a combined cycle power plant 10 in which the control routine described in more detail herein can be used includes a set of steam turbine power generation equipment 12 (e.g., a steam turbine system or a steam turbine power generation unit), a set of gas turbine power generation equipment 14 (e.g., a gas turbine system or a gas turbine power generation unit) and a controller 16 which functions to control the operation of both the steam turbine power generation equipment 12 and the gas turbine power generation equipment 14 via a fuel flow control valve 18 so as to produce a combined output load based on a load demand signal 20 provided to the controller 16. As will be understood, the steam turbine power generation equipment 12 may include any number of sets of power generating equipment such as condensers 22, steam turbines 24 for producing motive force (rotational force) from steam, electrical generators 26 for producing power from the motive force, and pipes and ducts, as well as other equipment 28, interconnecting the condensers 22, steam turbines 24, and a heat source, in this case in the form of exhaust heat from the gas turbine power equipment 14. As will be understood, the equipment upstream of the steam turbines 24 that heats steam therein may be considered to be steam turbine inlet equipment and steam may be exhausted from the steam turbines 24 to one or more condensers 22 via a steam outlet. In particular, in this case, the steam turbine power generation equipment 12 includes a heat recovery steam generator (HRSG) system 29 that recovers (energy) in the form of heat at one or more stages from the exhaust stack of the gas turbine generation equipment 14. Likewise, as will be understood, the steam turbine power generation equipment 12 may include various valves, sprayers, etc. which may be connected to the controller 16 and used by the controller 16 to control the operation of the steam turbines 24 and the HRSG system 29. Additionally, if desired, the steam turbine power generation equipment 12 may include a duct burner system 31, that burns fuel within the ducts of the fluid recovery system of the steam turbine power equipment 12 to provide additional heat to the steam entering the steam turbines 24. Of course, the fuel flow controllers (e.g., valves) for the duct burners in such a duct burner system may also be connected to and controlled by the controller 16 and thus the duct burners are variable control devices.

In a similar manner, the gas turbine power generation equipment 14 of FIG. 1 includes a set of burners coupled to or disposed within a combustion chamber 30, which burn fuel (e.g., natural gas) delivered from a gas inlet to create hot air (gases). The heated gases flow through one or more gas turbines 32 at high pressure to drive the gas turbines 32 which drives a motive force, such as a rotating shaft, connected to one or more gas turbine generators 34. The gas turbine electrical generators 34 then operate to create electrical power (e.g., electricity). The heated exhaust gas from the gas turbines then flows through a gas turbine exhaust including an exhaust stack 36, past the heat recovery steam generator system 29 to create steam for use in driving the steam turbines 24. As illustrated in FIG. 1, the combustion chamber 30 is coupled to the flue flow control valve 18 which is controlled by the controller 16 so as to control the flow of fuel (natural gas) into the combustion chamber 30 to thereby control the power output of the gas turbines 32 and the gas turbines 34.

As will be understood, the controller 16 may be implemented as any desired type of process controller hardware and/or software. In particular, the controller 16 may be configured or programmed to implement the control routines or techniques described herein in any desired manner. In one case, the controller 16 may include a general purpose processor 38 and a memory 39 which stores one or more control routines 40 therein as control or programming modules to be executed or implemented by the processor 38. The processor 38 may then implement the one or more control or programming modules 40 to become a specific processor that operates in the manner described herein to implement control of the combined cycle plant 10. In another case, the processor 38 may be in the form of an application specific integrated circuit (ASIC) and programmed with the program modules 40 as stored in a memory 39 of the ASIC to implement the control techniques described herein.

In a standard control system for a combined cycle power plant, such as that of the form illustrated in FIG. 1, the steam valves of the steam turbine generation equipment (e.g., valves in the HRSG system 29) are typically run or placed in a wide open (fully open) condition to minimize flow losses in the steam turbine cycle. As a result, the controller 16 is unable to use these control valves to control the operation of the steam turbines 24 but must, instead, control the fuel flow into the gas turbine combustion chamber 30 to control or effect the operation of the steam turbine cycle. As a result, load control on most combined cycle (CC) power plants tends to be implemented using open loop control systems, wherein a change in the unit MW (power) demand is sent directly to the gas turbine (GT) megawatt controllers without accounting for the potential megawatt (power) changes attributed to the steam turbines. The eventual (or instantaneous) megawatt (power) change on the steam turbine is then subtracted from the gas turbine demand to achieve the final steady state unit megawatt (MW) required. Unfortunately, this type of control, which can be effective over longer periods of time, results in the existence of a large steam turbine cycle response time to changes in the fuel flow within the gas turbine cycle, as a change in fuel flow in the gas turbine cycle must result in the creation of additional heat in the gas turbine exhaust stack 36, which then heats water in the HRSG system 29 to create additional steam pressure. Because of these physical dynamics, the changes in the steam pressure at the input of the steam turbines 24 significantly lags a change in the fuel flow to the gas turbine combustion chamber 30, resulting in a large or long response time of the steam turbine power generation equipment 12 (e.g., on the order of two to four or more minutes). Thus, the response time of the gas turbines 32 to the control signal sent to control the operation of the gas turbine system 14 is significantly shorter (i.e., faster) than the response time of the steam turbines 24 in response to the control signal sent control the operation of the gas turbine system 14.

As, as will be understood, the slow response time of the steam turbine generation equipment 12 typically leads to open loop control of the gas turbine power generation equipment 14, which has a much lower response time and which is typically controlled or modulated in a manner to provide for any needed short term changes in load demand. As the steam turbine power generation equipment ramps up to assist in the providing the desired plant load output, the gas turbine power generation equipment is controlled or modulated down to provide less output power or load (which again effects the operation of the steam turbine power generating equipment 12). While this type of control may be effective with slowly changing load demands, or when the load demand is relatively stable, this type of control leads to over or under use of the gas turbine power generation equipment 14 when the load demand is experiencing many changes or is cycling.

FIGS. 2-6 illustrate a set of control routines that can be used to control the combined cycle power plant 10 of FIG. 1 in a manner that provides better or more control of the output load in response to quickly changing or a cycling load demand. In particular, the control schemes described herein rely on the internal model principle, which generally states that accurate control can be achieved only if the control system encapsulates (either implicitly or explicitly) some representation of the process to be controlled. Generally speaking, the objective of the control scheme described herein is to use the modeled steam turbine MW (power) change attributed to a gas turbine demand change (i.e., a ST/GT transfer function) within a conventional closed loop feedback control system. This control scheme is thus a form of internal model control (IMC) and is expected to provide better unit MW (power) set-point tracking and disturbance variable rejection for overall more robust control. Moreover, the end result of implementing this control scheme optimizes gas turbine operation and achieves cost savings over time.

Figure 2:
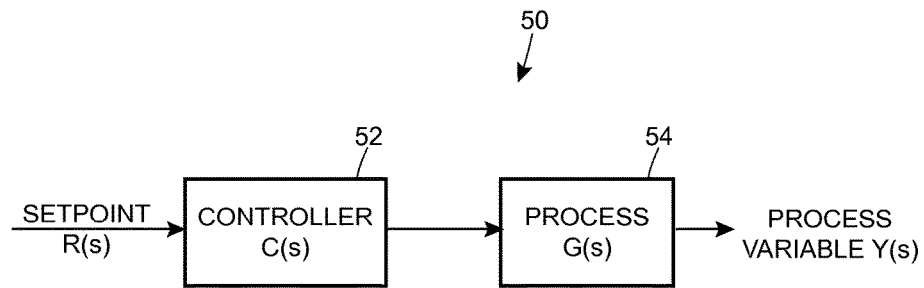
FIG. 2 illustrates a block diagram of a typical open loop control system used to control a process.

By way of background, FIG. 2 illustrates an open loop control system 50 having a controller 52 with a control transfer function C(s) coupled to and controlling a process 54 with a transfer function G(s). The controller 52 receives a set point R(s) and drives the process 54 to effect the value of or to drive a particular process variable Y(s) (called the controlled variable). In the case of the control system 50 of FIG. 2, if the controller transfer function C(s) is the exact inverse model of the process transfer function G(s), then the process variable Y(s) will track the set-point R(s) perfectly. However, in practice there will always be modeling error and disturbances, and therefore some form of feedback mechanism is required for the controller 52 to correct for modeling error and disturbances. There are also cost and feasibility issues with this type of open loop control effort that may be difficult to overcome.

Figure 3:
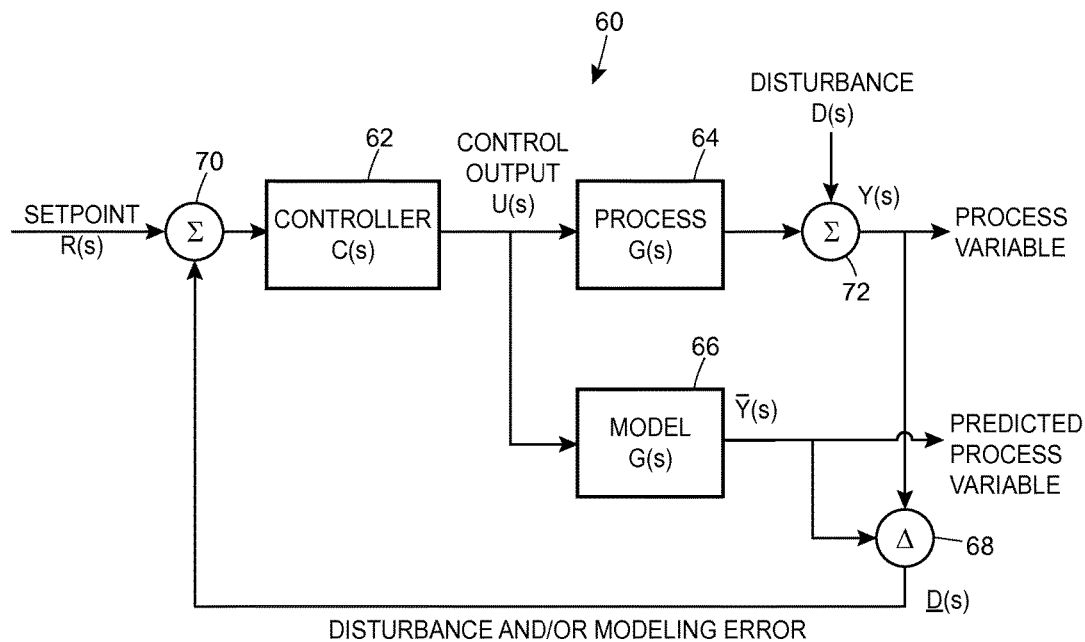
FIG. 3 illustrates a block diagram of a typical closed loop control system using internal model control to control a process.
Figure 6:
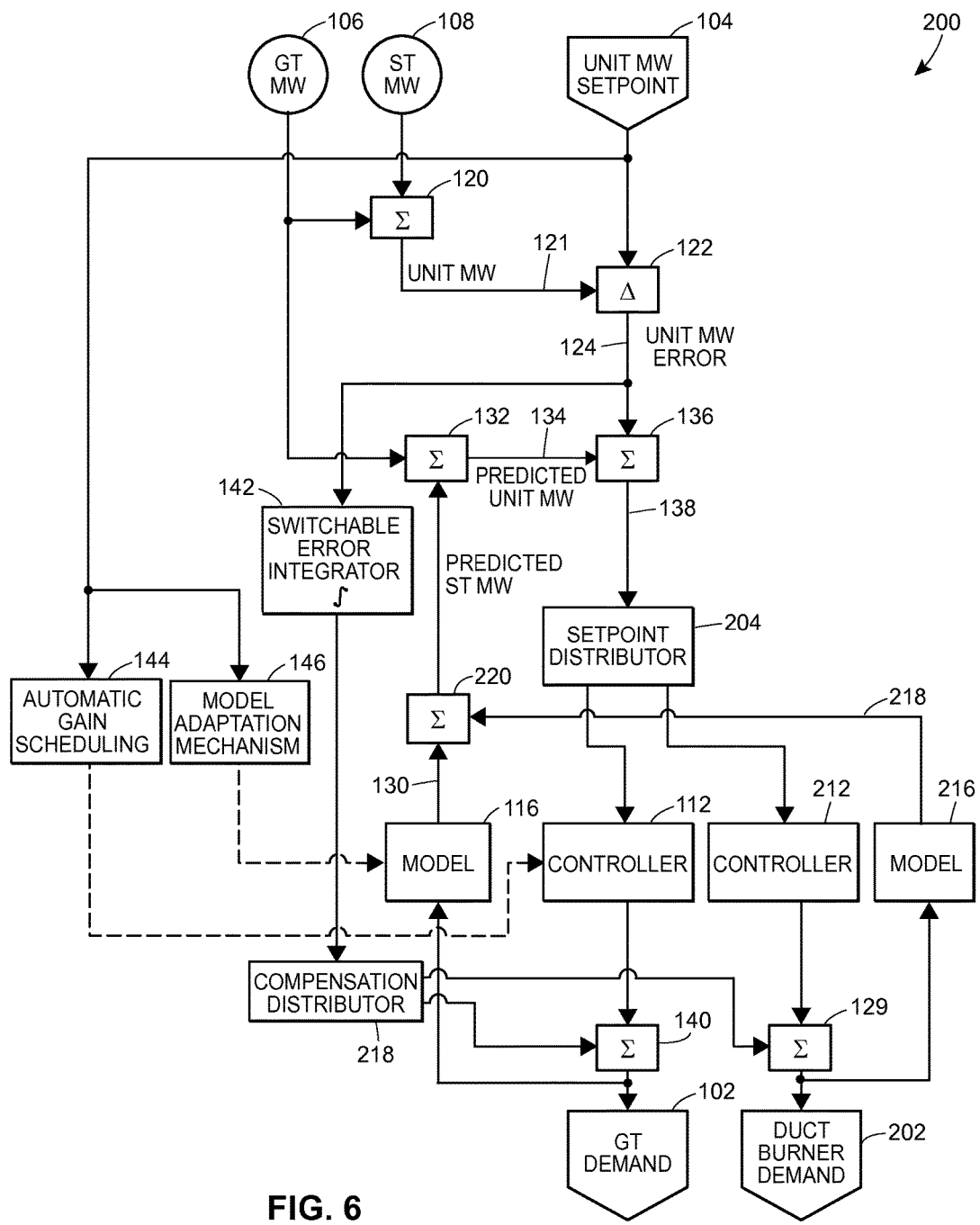
FIG. 6 illustrates a block diagram of a control routine that may be used on the closed loop control system of FIG. 4 to provide enhanced control of a combined cycle power generation plant having duct burners.

A closed loop control system 60 depicted FIG. 3 illustrates the general form of an internal model control strategy. In particular, the control system 60 of FIG. 3 includes a controller 62 (which may be the controller 52 of FIG. 2) that produces a control signal U(s) that operates to control a process 64 (which may be the same as the process 54 of FIG. 1). In particular, the control signal U(s) controls some device or devices within the process 64 to effect and thereby control the process variable Y(s). In this case a model unit 66, having a model of the process 64 (labeled as a model having a transfer function $\overline{G}(s)$ in FIG. 3), receives the control signal U(s) and produces a predicted value $\overline{Y}(s)$ of the process variable Y(s) being controlled. A summing unit 68 determines the error $\underline{D}(s)$ between the actual process variable Y(s) and the predicted process variable $\overline{Y}(s)$ as output by the model unit 66. The error $\underline{D}(s)$, which is a function of and represents disturbances in the process 64 and modeling error in the model 66, is then summed with a set point signal R(s) in a summer 70. The output of the summer 70 is fed back to the controller 62 as a controller input. Additionally, for the sake of illustration, FIG. 6 illustrates a summing unit 72 which sums a disturbance value D(s) with the output of the process 64 to represent the inclusion of unmodeled disturbances in the process variable Y(s).

If the model $\overline{G}(s)$ of the model unit 66 is a perfect representation of the process transfer function G(s), and if there are no disturbances D(s), then the output of the summer 68 $\underline{D}(s)$ will be equal to zero, and the control loop of FIG. 3 simply reduces to an ideal open loop control system. However, as this situation is rarely the case, the controller 62 can be tuned in known manners to meet application demands for both the set-point tracking and disturbance rejection.

Figure 4:
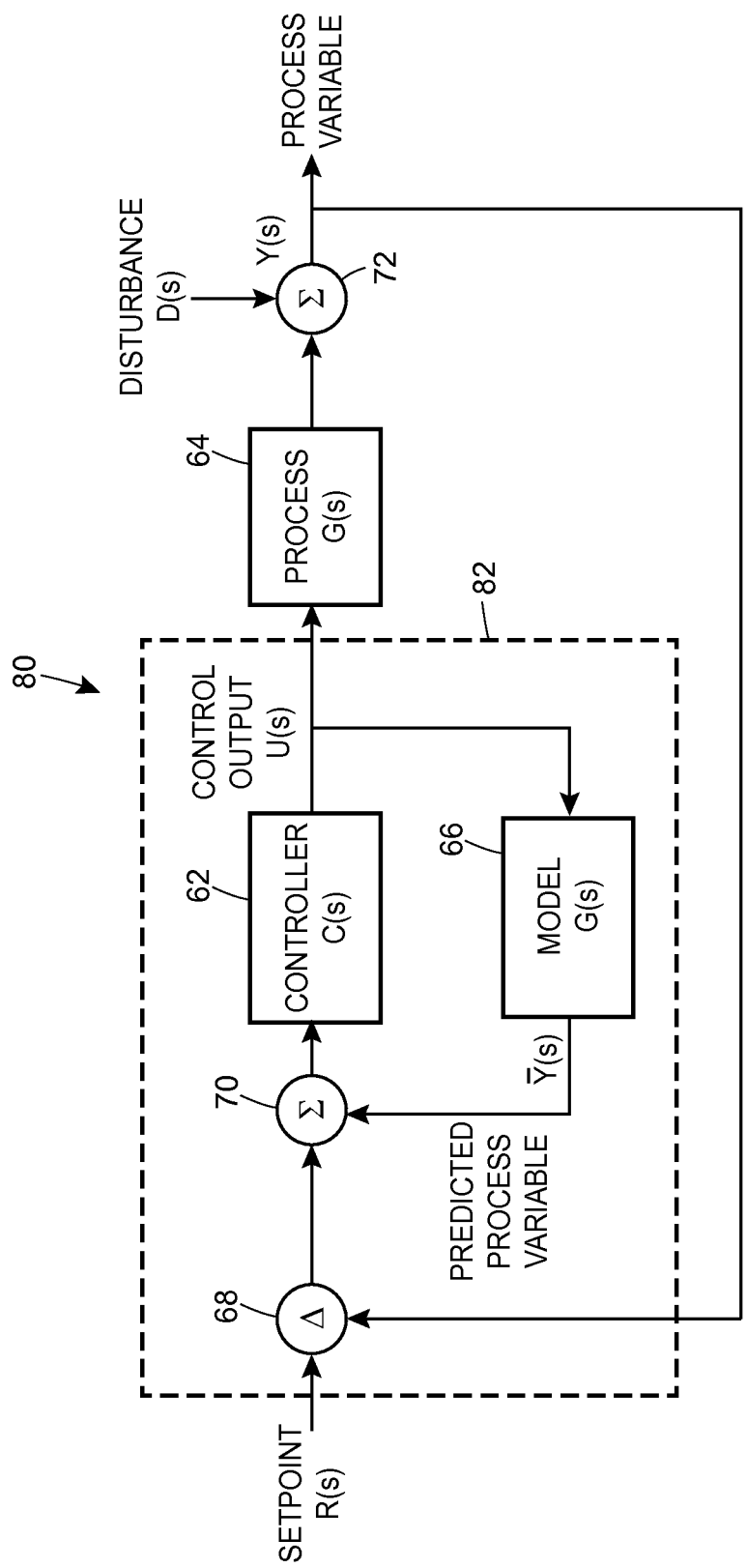
FIG. 4 illustrates a block diagram of another form of the closed loop control system of FIG. 3.

FIG. 4 depicts a control system 80 that is simply a re-arranged form of the control system 60 of FIG. 3, to be in a conventional feedback controller framework. As such, the reference numbers of FIG. 4 illustrate the same or similar elements as those of FIG. 3. The basic difference between the diagrams of FIGS. 3 and 4 is that the inputs to the summers 68 and 70 have changed so that the difference unit 68 computes the difference between the set point R(s) and the process variable Y(s) to produce an error signal, which is then added to the predicted process variable $\overline{Y}(s)$ as output by the model unit 66 to produce the input to the controller 62. However, the final output of the summer 70 is the same in both FIGS. 3 and 4. Moreover, a dashed box 82 of FIG. 4 illustrates the functions performed by an IMC controller that can be used to implement the combined cycle load control scheme described herein.

Figure 5:
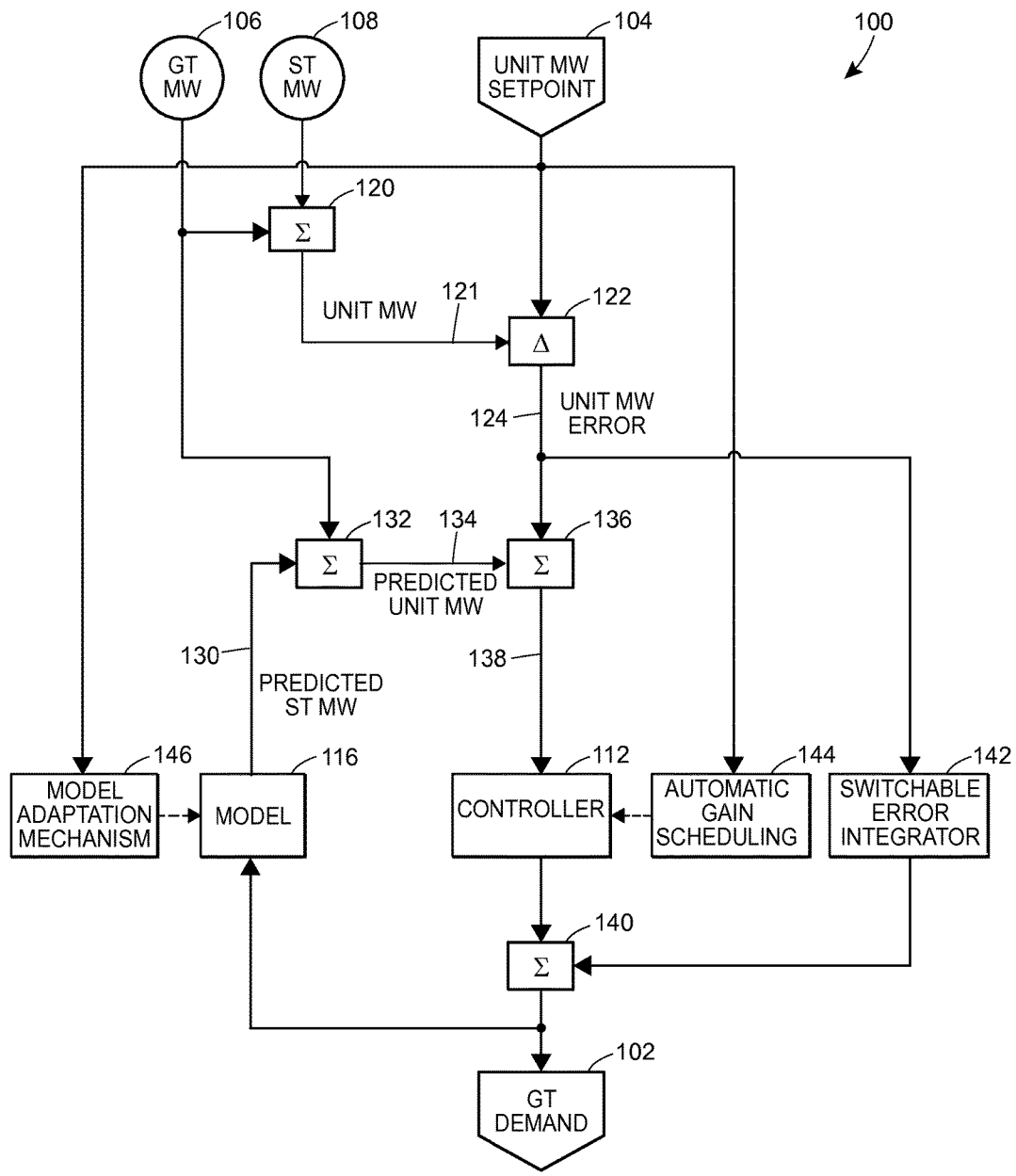
FIG. 5 illustrates a block diagram of a control routine that may be used in the closed loop control system of FIG. 4 to provide enhanced control of a combined cycle power generation plant.

FIG. 5 depicts a block diagram of a new combined cycle plant load control scheme 100 that may be implemented as the IMC controller 82 of FIG. 4. In the control scheme of FIG. 5, the unit MW (power) output by the plant or the process 64 is the process variable Y(s) of FIG. 4 (that is, the controlled variable of the control scheme), the gas turbine (GT) demand (control signal) 102 is the controller output U(s) of FIG. 4 and the unit power (MW) set point 104 is the set point R(s) of FIG. 4. As will be understood, the gas turbine (GT) demand signal 102 is the total MW (power) to generated by the gas turbines (e.g., the gas turbines 32 of FIG. 1). On units with multiple gas turbines, this demand may be distributed in any known or desired manner for a combined gas turbine MW (power). Moreover, as indicted in FIG. 5, the control scheme 100 uses the, for example measured, instantaneous MW (power) output of the gas turbine(s) 106 and the, for example measured, instantaneous MW (power) output of the steam turbine(s) 108 as inputs. Moreover, the control scheme 100 of FIG. 5 includes a control system having a controller 112, which may be any desired type of general controller or compensator (such as a lead/lag compensator), and a model system having a model unit 116 that implements a predictive model of the steam turbine cycle. The controller algorithm within the controller 112 may be selected based on the model used in the model unit 116 as identified for a best fit. As will be understood, the model unit 116 models the operation of the steam turbine generation system (e.g. of FIG. 1) in response to changes in the gas turbine demand (control) signal. Thus, the model system and in particular the model unit 116 operates to predict the output power of the steam turbine system in response to changes in the gas turbine control signal or the GT demand signal 102. The model algorithm used in the model unit 116 may be based on dynamic prediction using auto-regression or other desired techniques and modeling may be performed using empirical testing. Because the time constant for the production of the gas turbine power (e.g., five to thirty seconds) is significantly shorter than that of the steam turbine power (e.g., two to four minutes), the gas turbine operation does not need to be modeled. However, the gas turbine operation could be incorporated into the model unit 116 or could be provided by a different modeling unit, if so desired.

During operation, a summer 120 sums the instantaneous gas turbine MW (power) output signal 106 with the instantaneous steam turbine MW (power) output signal 108 to produce a measure of the total plant output or unit MW (power) output 121. The signal 121 represents the process variable Y(s) of FIG. 4. The output of the summer 120 is provided as an input to a summer 122, which also receives the unit MW (power) set point signal 104 as an input. The summer 122 (which is essentially the summer 68 of FIG. 4), computes the difference between the unit MW output 121 and the unit MW set point 104 (which may change in response to changing load demands). Thus, the output of the summer 122 is a difference signal representing a unit MW error 124.

The model unit 116 receives or is coupled to receive the control signal output by the controller 112 (as processed by a summer 140) and produces a model output 130 that represents a predicted steam turbine power output (for the current time) which is provided to a summer 132. The summer 132 sums the output 130 of the model 116 (which is a predicted steam turbine power output signal) with the instantaneous (measured) gas turbine power output signal 106 to produce a predicted unit MW (predicted plant output) signal 134 representing the predicted power output of the plant (i.e., the process 64 of FIG. 4).

As illustrated in FIG. 5, the predicted unit MW (predicted plant output) signal 134 is provided to a summer 136 which sums the predicted unit MW (predicted plant output) signal 134 with the unit MW error signal 124 to produce a feedback signal 138 input to the controller 112. (The summer 136 is essentially the summer 70 of FIG. 4 while the model unit 116 and the summer 132 represent the model 66 of FIG. 4.) As will be understood, the various components in FIG. 5 besides the controller 112 and the model 116, including for example the summers 120, 122, 136, and in some cases 132 may be referred to as a controller input signal generation unit, as these components create a controller input signal 138 from a measured gas turbine output 106, a measured steam turbine output 108, a load or unit set point 104 and a predicted steam turbine output signal and/or a predicted unit output signal 134. In any event, the controller 112 uses the input signal 138 to produce an initial gas turbine load control signal which is provided to the summer 140, the output of which is provided to the model 116. (In this case, the final or compensated control output may be deemed to be the output of the summer 140 which may be part of the controller 112). However, if desired, the initial gas turbine load control signal output by the controller 112 may be used as the control signal to the gas turbine(s), e.g., as a fuel flow control signal to the gas turbine(s).

As will be understood, the control scheme 100 of FIG. 5 uses an internal model of the power plant that models or predicts the output of only one cycle of the combined cycle power plant (e.g., the steam turbine cycle) and that uses, for example, a measured output of the other cycle of the power plant (e.g., the gas turbine cycle) to produce the predicted power output of the power plant (that is, the predicted process variable $\overline{Y}$(s) of FIG. 4). This model is simpler to create and implement than a model that attempts to model both the gas turbine cycle and the steam turbine cycle together. The use of this type of simplified model is acceptable, however, because of the significantly different response times of the two cycles (e.g., approximately or greater than an order of magnitude).

If desired, the control scheme 100 depicted FIG. 5 may include a switchable steady state error integrator 142 configured to integrate the unit MW error signal 124 to produce a compensation signal that is input to the summer 140, wherein the compensation signal is combined (e.g., added) to the initial control signal output from the controller 112, to produce a compensated control output to enhance performance of the control scheme 100. In particular, the steady state error integrator 142 operates in response to the unit MW error signal 124 to produce a compensation signal that attempts to reduce the steady state controller error to zero. Generally, to zero out this error requires a pure integrator disposed within the closed loop transfer function, wherein the error integrator is a function of the model and the controller gains. Although these gains can be determined to bring the error offset close to zero, an error integrator with a time constant several magnitudes greater than that of the process variable helps to ensure that the controller error will be zeroed out over time. However, because the error integrator 142 is designed to zero out the controller error during steady state conditions, the error integrator 142 is generally turned off during load ramps and is thus switchable in response to changes in the load demand set point.

Still further, as illustrated in FIG. 5, an automatic gain scheduling unit 144 may be used to modify the operation of the controller 112 to retain the best fit with a non-linear process model used in the model unit 116. The gain scheduler 144 of FIG. 5 is responsive to the unit MW set point signal 104 and may implement any known or desired gain scheduling routine based on, for example, the value or range of the unit MW (load demand) set point 104. Generally speaking, the gain scheduler 144 may tune the controller 112 with different controller gains at different times based on the operating point of the power plant (e.g., the desired load output). As automatic gain schedulers are known, the gain scheduler 144 will not be described in further detail.

Moreover, the control scheme 100 illustrated in FIG. 5 may include a model adaptation unit 146, which operates to adapt the model used by the model unit 116 for better performance. In particular, the model adaptation unit 146 helps to account for nonlinearities when operating across wide load ranges with different combined cycle configurations (e.g., 1×1, 2×1, 3×1 etc.). This mechanism can be based on fuzzy logic techniques or using any other known model adaptation technique.

Generally speaking, the control scheme 100 of FIG. 5 implements better control of a combined cycle power plant, especially in response to varying load demands. Generally speaking, the control scheme 100 implements an internal model controller technique using a predictive model of one cycle of the combined cycle (e.g., the steam turbine cycle) without using a predictive model of the other cycle (e.g., the gas turbine cycle). The control scheme 100 is able to use this configuration because of the significant differences in the response times of the gas turbine cycle and the steam turbine cycle, which has a significantly longer response time than the gas turbine response time. Moreover, the control scheme 100 of FIG. 5 produces a predicted output (e.g., a predicted unit MW output) using a predicted value for one of the cycles (i.e., the steam turbine cycle) and a measured or instantaneous output value (the actual gas turbine MW output) for the other of the cycles.

FIG. 6 details a load control scheme 200 that is an expansion of the load control scheme 100 of FIG. 5 to units with duct burners as part of the steam turbine cycle. In particular, the control scheme or technique 200 of FIG. 6 has elements that operate in the same manner as those of FIG.

5, and like elements are numbered the same. However, the control scheme 200 of FIG. 6 also produces a duct burner demand or control signal 202 which is used to operate or control the operation of the duct burners (e.g., the fuel flow to the duct burners) in the steam turbine cycle.

As will be seen, the control system 200 of FIG. 6 includes a set point distributor unit 204, a further controller 212, a further model unit 216, a compensation distributor 218, and a further summer 219. The controller 212, which produces the duct burner demand signal 202 may be any desired type of general controller or compensator (such as a lead/lag compensator). The duct burner demand signal 202 represents or controls the total MW (power) to be generated by the duct burners. On units with multiple HRSGs, this demand is distributed as necessary for combined duct burner MW (power). Moreover, it will be understood that the demand to the duct burners may be or may be manipulated further to produce a gas (or other fuel) flow demand signal.

The model unit 216 in this case includes a predictive model that models or simulates the power output operation of the duct burners in the steam turbine cycle and, in particular, that models the effect of changes to the fuel flow or other duct burner demand control signal 202 on the output power produced by the steam turbines. In particular, the model unit 216 models changes in output power generated by the steam turbines that are in response to or that are caused by changes to the operation of the duct burners and produces a predicted power output 218 that represents the steam turbine power generated as a result of the operation of the duct burners.

Still further, the set point distributor 204 of the control scheme 200 of FIG. 6 is responsive to the feedback signal 138 output by the summer 136 and operates to distribute the unit MW set point to both the gas turbines and the duct burners, based on, for example, economic and/or other factors. That is, the set point distributor 204 determines the ratio of the power needed to be produced in response to each of the two control signals 102 and 202 (i.e., the gas turbine fuel flow and the duct burner fuel flow) and produces separate set points or input signals for each of the controllers 112 and 212 based on this ratio. Set point distributors are well known in the art and any desired type of set point distributor could be used as the unit 204. Likewise, the compensation distributor 218, which is connected to the summers 140 and 219, distributes the compensation output of the error integrator block 142 to both the gas burner demand (control signal) 102 and the duct burner demand (control signal) 202. This feature is beneficial because, with the firing of duct burners, the gas turbines are generally constrained on load decreases to ensure sufficient airflow for the duct burners, which could mean that some or all of the error compensation needs to be taken care of by the duct burner control system instead of the gas turbine control system.

Still further, the control scheme 200 of FIG. 6 includes a further summer 220 that sums the outputs 130 and 218 of the models 116 and 216 to produce the total predicted steam turbine MW output signal, which is then provided to the summer 220. Of course, the summers 220 and 132 could be combined into a single summer unit.

In general, the control scheme 200 of FIG. 6 operates to determine the modeled or predicted output of the steam turbines based on changes to the gas turbine demand signal 102 and changes to the duct burner demand signal 202 when producing the estimated steam turbine output power. While the models 116 and 216 could be combined into a single, multiple-input predictive model, the dual model approach of FIG. 6 enables simpler and potentially more accurate modeling of the steam turbine power output based on multiple controlled inputs within the steam turbine cycle. The form of the control scheme 200 of FIG. 6 could be similarly increased in the same manner to include other controllers and models that control and model the effect of other control inputs to the power plant, should any exist.

Still further, while not shown in FIG. 6, automatic gain scheduling may be performed for the controller 216, a switchable error integrator may be used to condition the duct burner demand signal 202 and a model adaptation unit may be used on the model 216 to adapt the model 216 based on, for example, load demand, all in similar manners as discussed with respect to the control scheme of FIG. 5.

Of course, the control schemes of FIGS. 5 and 6 may be used on other types of combined cycle plants or dual equipment plants (e.g., ones that use other than gas turbines and/or steam turbine cycles). Moreover, while the forgoing description of combined cycle control of a plant has been described in the context of controlling a power generating plant and, in particular, a combined cycle power plant having steam and gas turbine operated power generating equipment, these model-based control techniques can be used in other process control systems, such as in industrial process control systems used to control industrial or manufacturing processes. More particularly, this control method may be effectively used in any process plant or control system that simultaneously controls processes or equipment having different response times.

Although the forgoing text sets forth a detailed description of numerous different embodiments of the invention, it should be understood that the scope of the invention may be defined by the words of the claims set forth at the end of this patent and their equivalents. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention. Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A power generation system, comprising:
a gas turbine power generation unit having a gas inlet, a gas burner coupled to the gas inlet to create combusted gas, a gas turbine coupled to the gas burner and powered by combustion of gas in the gas burner, and a combusted gas exhaust;
a steam turbine power generation unit having a steam inlet system, a steam turbine coupled to the steam inlet system and powered by steam from the steam inlet system, and a steam outlet, wherein the steam inlet system is coupled to the combusted gas exhaust to absorb heat from combusted gas in the combusted gas exhaust to produce heated steam within the steam inlet system;
an electrical energy generation unit mechanically coupled to the gas turbine and to the steam turbine to produce electrical energy based on movement of the gas turbine and the steam turbine; and a control system that develops a gas turbine control signal to control the combustion of gas within the gas burner to thereby control the electrical energy produced by the electrical energy generation unit,
wherein the control system includes a controller, a process model, and a controller input signal generation unit,
wherein an input of the process model is coupled to an output of the controller to produce a predicted steam turbine output
and the controller input signal generation unit develops a controller input signal for the controller by combining the predicted steam turbine output, a load set point, a measured gas turbine output and a measured steam turbine output.

2. The power generation system of claim 1, wherein the controller input signal generation unit combines the measured gas turbine output with the measured steam turbine output to produce a current unit output, and further develops a difference signal as the difference between the current unit output and the load set point.

3. The power generation system of claim 2, wherein the controller input signal generation unit further produces a predicted unit output by combining the predicted steam turbine output produced by the process model with the measured gas turbine output.

4. The power generation system of claim 3, wherein the controller input signal generation unit further produces the controller input signal by summing the difference signal with the predicted unit output.

5. The power generation system of claim 4, wherein the controller is a lead/lag compensator type of controller.

6. The power generation system of claim 1, wherein the control system further includes a model adaptation unit that adapts the process model.

7. The power generation system of claim 6, wherein the model adaptation unit is coupled to the load set point and adapts the process model based on the value of the load set point.

8. The power generation system of claim 1, wherein the control system further includes a gain scheduling unit coupled to the controller to adapt one or more gain values used in the controller to produce the output of the controller.

9. The power generation system of claim 8, wherein the gain scheduling unit is coupled to the load set point and adapts the one or more gains used by the controller based on the value of the load set point.

10. The power generation system of claim 1, further including an error integrator coupled to the controller.

11. The power generation system of claim 10, wherein the control system includes a summing unit that sums the output of the error integrator with an initial output of the controller to produce a compensated gas turbine control signal.

12. The power generation system of claim 11, wherein the error integrator is a switchable error integrator.

13. The power generation system of claim 11, wherein controller input signal generation unit generates a unit error as a difference between the load set point and the sum of the measured gas turbine output and the measured steam turbine output, and wherein the error integrator is coupled to receive the unit error.

14. The power generation system of claim 1, wherein the process model models the output of the steam turbine based on the operation of the gas turbine power generation unit in response to the gas turbine control signal.

15. The power generation system of claim 1, wherein the steam turbine power generation unit further includes a further burner system that burns a fuel to further heat steam within the steam inlet system, and wherein the control system further includes a second process controller coupled to the controller input signal generation unit to produce a second process control signal used to control the further burner system and a second process model coupled to receive an output of the second process controller to produce a further predicted steam turbine output based on the operation of the further burner system.

16. The power generation system of claim 15, wherein the controller input signal generation unit combines an output of the process model with the further predicted steam turbine output to produce the predicted steam turbine output.

17. The power generation system of claim 16, wherein the controller input signal generation unit combines the measured gas turbine output with the measured steam turbine output to produce a current unit output, and further develops a difference signal as the difference between the current unit output and the load set point and further produces a predicted unit output by combining the predicted steam turbine output with the measured gas turbine output.

18. The power generation system of claim 17, wherein the controller input signal generation unit further produces a preliminary controller input signal by summing the difference signal with the predicted unit output.

19. The power generation system of claim 18, wherein the controller input signal generation unit includes a set point distributor coupled to receive the preliminary controller input signal to produce the controller input signal and a second controller input signal which is provided as an input to the second process controller.

20. The power generation system of claim 1, wherein the electrical energy generation unit includes a first electrical generator mechanically coupled to the gas turbine to produce electrical energy based on movement of the gas turbine and a second electrical generator coupled to the steam turbine to produce electrical energy based on movement of the steam turbine.

21. A power generation system, comprising:
a gas turbine power generation unit having a gas inlet, a gas burner coupled to the gas inlet to create combusted gas, a gas turbine coupled to the gas burner and powered by combustion of gas in the gas burner, and a combusted gas exhaust;
a steam turbine power generation unit having a steam inlet system, a steam turbine coupled to the steam inlet system and powered by steam from the steam inlet system, and a steam outlet, wherein the steam inlet system is coupled to the combusted gas exhaust to absorb heat from combusted gas in the combusted gas exhaust to produce heated steam within the steam inlet system;
an electrical energy generation unit mechanically coupled to the gas turbine and to the steam turbine to produce electrical energy based on movement of the gas turbine and the steam turbine; and
a control system that develops a gas turbine control signal to control the combustion of gas in the gas burner to thereby control the electrical energy produced by the electrical energy generation unit,
wherein the control system includes a controller, a process model system, and a controller input signal generation unit,
wherein the process model system includes a steam turbine model coupled to an output of the controller to produce a predicted steam turbine output and a summer that sums a measured gas turbine output with the predicted steam turbine output to produce a predicted unit output, and wherein the controller input signal generation unit develops a controller input signal for the controller by combining the predicted unit output with a load set point, the measured gas turbine output and a measured steam turbine output.

22. The power generation system of claim 21, wherein the controller input signal generation unit combines the measured gas turbine output with the measured steam turbine output to produce a current unit output, and further develops a difference signal as the difference between the current unit output and the load set point.

23. The power generation system of claim 22, wherein the controller input signal generation unit further includes a summer that combines the predicted unit output with the difference signal.

24. The power generation system of claim 21, wherein the controller input signal generation unit includes a summing system that combines the measured gas turbine output, the measured steam turbine output, the load set point, and the predicted unit output to produce the controller input signal for use by the controller.

25. The power generation system of claim 24, wherein the controller is a lead/lag compensator type of controller.

26. The power generation system of claim 24, wherein the control system further includes a model adaptation unit coupled to the load set point to adapt the process model based on the value of the load set point.

27. The power generation system of claim 24, wherein the control system further includes a gain scheduling unit coupled to the controller to adapt one or more gain values used in the controller to produce the output of the controller.

28. The power generation system of claim 24, further including an error integrator coupled to the output of the controller and including a summing unit that sums an output of the error integrator with an initial output of the controller to produce a compensated gas turbine control signal.

29. The power generation system of claim 28, wherein controller input signal generation unit generates a unit error as a difference between the load set point and the sum of the measured gas turbine output and the measured steam turbine output, and wherein the error integrator is coupled to receive the unit error.

30. The power generation system of claim 24, wherein the process model models the output of the steam turbine based on the operation of the gas turbine power generation unit in response to the gas turbine control signal.

31. The power generation system of claim 24, wherein the steam turbine power generation unit further includes a further burner system that burns a fuel to further heat steam within the steam inlet system, and wherein the control system further includes a second process controller coupled to the controller input signal generation unit to produce a second process control signal used to control the combustion of fuel within the further burner system and a second process model coupled to receive an output of the second process controller to produce a further predicted steam turbine output based on the operation of the further burner system.

32. The power generation system of claim 31, wherein the process model system combines an output of the process model with the further predicted steam turbine output to produce the predicted steam turbine output.

33. The power generation system of claim 32, wherein the controller input signal generation unit combines the measured gas turbine output with the measured steam turbine output to produce a current unit output, and further develops a difference signal as the difference between the current unit output and the load set point and further produces a preliminary controller input signal by summing the difference signal with the predicted unit output.

34. The power generation system of claim 33, wherein the controller input signal generation unit includes a set point distributor coupled to receive the preliminary controller input signal to produce the controller input signal and a second controller input signal which is provided as an input to the second process controller.

35. A controller for use in producing a control signal to control the operation of a power generator having first and second power generation units interconnected such that changing the control of the first power generation unit effects the operation of the second power generation unit, comprising:
a processor; and
a computer readable memory that stores a controller routine for implementation on the processor to generate the control signal for use in controlling the first power generation unit, the controller routine including;
a process control routine that produces an output signal used to generate the control signal,
a process model system including a process model for modeling the second power generation unit, and
a process control input signal generation routine,
wherein the process model is coupled to receive an output of the process control routine to produce a predicted second power generation unit output and the process model system sums a measured first power generation unit output with the predicted second power generation unit output to produce a predicted unit output, and
wherein the process control input signal generation routine develops a controller input signal for the process control routine by combining the predicted unit output with a load set point, the measured first power generation unit output and a measured second power generation unit output.

36. The controller of claim 35, wherein the process control input signal generation routine combines the measured first power generation unit output with the measured second power generation unit output to produce a current unit output, and further develops a difference signal as the difference between the current unit output and the load set point.

37. The controller of claim 36, wherein the process control input signal generation routine further includes a summer that combines the predicted unit output with the difference signal.

38. The controller of claim 35, wherein the process control input signal generation routine combines the measured first power generation unit output, the measured second power generation unit output, the load set point, and the predicted unit output to produce the controller input signal for use by the process control routine.

39. The controller of claim 35, wherein the process model models the output of the second power generation unit based on the operation of the first power generation unit in response to the control signal.

40. The controller of claim 35, wherein the second power generation unit includes a variable control device that effects the operation of the second power generation unit without effecting the operation of the first power generation unit, and wherein the controller routine further includes a second process control routine coupled to receive the output of the process control input signal generation routine to produce a second process control signal used to control the variable control device of the second power generation unit and includes a second process model coupled to receive an output of the second process control routine to produce a further predicted second power generation unit output based on the operation of the variable control device.

41. The controller of claim 40, wherein the process model system combines an output of the process model with the further predicted second power generation unit output to produce the predicted second power generation unit output.

42. The controller of claim 41, wherein the process control input signal generation routine combines the measured first power generation unit output with the measured second power generation unit output to produce a current unit output, and further develops a difference signal as the difference between the current unit output and the load set point and further produces a preliminary controller input signal by summing the difference signal with the predicted unit output.

43. The controller of claim 42, wherein the controller input signal generation routine includes a set point distributor coupled to receive the preliminary controller input signal to produce the controller input signal and a second controller input signal which is provided as an input to the second process control routine.

44. A method of controlling a process having two controllable units that are interconnected such that changing a control signal to the first unit to change an output of the first unit also changes an output of the second unit, wherein the first unit has a response time to the control signal to the first unit that is significantly shorter than the response time of the second unit to the control signal to the first unit, comprising:
measuring an output of the first unit;
measuring an output of the second unit;
receiving a set point indicating a desired total output of the first and second units;
predicting the combined output of the first unit and the second unit in response to the control signal provided to the first unit, including modeling, via a processor, an operation of the second unit in response to the control signal to the first unit to develop a predicted second unit output, and adding, using the processor, the predicted second unit output with the measured output of the first unit to produce a predicted combined output of the first unit and the second unit;
developing, via a processor, a control routine input signal based on the measured output of the first unit, the measured output of the second unit, the set point and the predicted combined output of the first unit and the second unit; and
executing, via the processor, a control routine that determines the control signal for use in controlling the operation of the first unit based on the control routine input signal.

45. The method of claim 44, wherein modeling, via the processor, an operation of the second unit in response to the control signal delivered to the first unit to develop a predicted second unit output includes implementing a process model via the processor that models the response of the second unit to the control signal provided to the first unit over time.

46. The method of claim 44, wherein developing the control routine input signal includes combining, using the processor, the predicted combined output of the first unit and the second unit with the set point, the measured first unit output and the measured second unit output.

47. The method of claim 46, wherein developing the control routine input signal, includes combining, using the processor, the measured first unit output with the measured second unit output to produce a combined unit output, and further developing a difference signal as the difference between the combined unit output and the set point.

48. The method of claim 47, wherein developing the control routine input signal includes summing, using the processor, the predicted combined output of the first unit and the second unit with the difference signal.

49. The method of claim 44, furthering including implementing, using a processor, a second process control routine to develop a second control signal for controlling an operation of the second unit via a variable control device that effects the operation of the second unit, and wherein predicting the combined output of the first unit and the second unit in response to the control signal to the first unit, including modeling, via the processor, an operation of the second unit in response to the second control signal to develop a further predicted second unit output, and adding, using the processor, the predicted second unit output and the further predicted second unit output to the measured output of the first unit to produce the predicted combined output of the first unit and the second unit.

50. The method of claim 49, wherein generating the control routine input signal includes combining, using the processor, the measured first unit output with the measured second unit output to produce a current unit output, and further includes developing, using the processor, a difference signal as the difference between the current unit output and the set point and further includes producing, using the processor, a preliminary controller input signal by summing the difference signal with the predicted combined output of the first unit and the second unit.

51. The method of claim 50, further including determining, using the processor, the control routine input signal and a second control routine input signal, that is provided as an input to the second process control routine, from the preliminary controller input signal.

52. The method of claim 51, further including executing a set point distributing routine on the processor to determine the control routine input signal and the second control routine input signal.

53. The method of claim 44, further including providing the control signal to the first unit to control the operation of the first unit.

54. A method of controlling a power generation process having first and second interconnected power generation units using a control signal provided to control the operation of the first power generation unit, comprising:
measuring an output of the first power generation unit;
measuring an output of the second power generation unit;
receiving a set point indicating a desired total output of the first and second power generation units;
predicting the combined output of the first and second power generation units in response to the control signal provided to the first power generation unit, including modeling, via a processor, an operation of the second power generation unit in response to the control signal delivered to the first power generation unit to develop a predicted second power generation unit output, and adding, using the processor, the predicted second power generation unit output with the measured output of the first power generation unit to produce the predicted combined output of the first and second power generation units;

developing, via a processor, a control routine input signal based on the measured output of the first power generation unit, the measured output of the second power generation unit, the set point and the predicted combined output of the first and second power generation units; and executing, via the processor, a control routine that determines the control signal for use in controlling the operation of the first power generation unit based on the control routine input signal.

55. The method of claim 54, wherein the first power generation unit is a gas turbine power generation unit and the second power generation unit is a steam turbine power generation unit.

56. The method of claim 55, wherein modeling, via the processor, an operation of the second power generation unit in response to the control signal delivered to the first power generation unit to develop the predicted second power generation unit output includes implementing a process model via the processor that models the response of the second power generation unit to the control signal provided to the first power generation unit over time.

57. The method of claim 55, wherein developing the control routine input signal includes combining, using the processor, the predicted combined output of the first and second power generation units with the set point, the measured first power generation unit output and the measured second power generation unit output.

58. The method of claim 57, wherein developing the control routine input signal, includes combining, using the processor, the measured first power generation unit output with the measured second power generation unit output to produce a combined power generation unit output, and further developing a difference signal as the difference between the combined power generation unit output and the set point, and further includes summing, using the processor, the predicted combined output of the first and second power generation units with the difference signal.

59. The method of claim 54, further including implementing, using a processor, a second process control routine to develop a second control signal for controlling an operation of the second power generation unit via a variable control device that effects the operation of the second power generation unit, and wherein predicting the combined output of the first and second power generation units in response to the control signal provided to the first power generation unit further includes modeling, via the processor, an operation of the second power generation unit in response to the second control signal to develop a further predicted second power generation unit output, and adding, using the processor, the predicted second power generation unit output and the further predicted second power generation unit output to the measured output of the first power generation unit to produce the predicted combined output of the first and second power generation units.

60. The method of claim 59, wherein generating the control routine input signal includes combining, using the processor, the measured first power generation unit output with the measured second power generation unit output to produce a combined power generation unit output, and further includes developing, using the processor, a difference signal as the difference between the combined power generation unit output and the set point and further includes producing, using the processor, a preliminary controller input signal by summing the difference signal with the predicted combined output of the first and second power generation units.

61. The method of claim 60, further including determining, using the processor, the control routine input signal and a second control routine input signal, that is provided as an input to the second process control routine, from the preliminary controller input signal by executing a set point distributing routine on the processor to determine the control routine input signal and the second control routine input signal.

* * * * *